US008630636B2

(12) United States Patent
Eguchi

(10) Patent No.: US 8,630,636 B2
(45) Date of Patent: Jan. 14, 2014

(54) RADIO BASE STATION AND RADIO COMMUNICATION METHOD

(75) Inventor: Hidehiro Eguchi, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 211 days.

(21) Appl. No.: 13/203,238

(22) PCT Filed: Feb. 25, 2010

(86) PCT No.: PCT/JP2010/053008
§ 371 (c)(1),
(2), (4) Date: Aug. 24, 2011

(87) PCT Pub. No.: WO2010/098409
PCT Pub. Date: Sep. 2, 2010

(65) Prior Publication Data
US 2011/0312342 A1    Dec. 22, 2011

(30) Foreign Application Priority Data

Feb. 25, 2009  (JP) ................................. 2009-043164

(51) Int. Cl.
*H04W 24/00* (2009.01)
*H04W 72/00* (2009.01)
*H04W 4/00* (2009.01)
*H04B 17/00* (2006.01)

(52) U.S. Cl.
USPC ..... 455/423; 455/67.11; 455/450; 455/452.1; 455/452.2; 370/329

(58) Field of Classification Search
USPC .......................... 455/423–425, 450–453, 455; 370/329–330
See application file for complete search history.

(56) References Cited

FOREIGN PATENT DOCUMENTS

| JP | 2004-207840 A | 7/2004 |
|---|---|---|
| JP | 2007-235683 A | 9/2007 |
| JP | 2008-205867 A | 9/2008 |
| WO | WO 2008093621 A1 * | 8/2008 |

OTHER PUBLICATIONS

International Search Report and Written Opinion dated May 18, 2010 issued by the Japanese Patent Office for International Application No. PCT/JP2010/053008.

(Continued)

*Primary Examiner* — Wesley Kim
*Assistant Examiner* — Nam Huynh
(74) *Attorney, Agent, or Firm* — Procopio, Cory, Hargreaves & Savitch LLP

(57) ABSTRACT

The disclosed radio base station (1A) executes radio communication with a radio terminal that measures the SNR or CNR of each of a plurality of predetermined subbands. The radio base station (1A) includes a radio communication unit (110), which receives a CQI indicating the SNR or CNR for each subband a plurality of times, or receives the CQI from a plurality of radio terminals that include said radio terminal, a counting unit (122c), which counts, for each of the plurality of subbands, the number of times that the radio communication unit (110) has received a CQI that has degraded more than a predetermined threshold value, and an interfered subband detector (123), which detects those subbands from among the plurality of subbands for which the count has reached a predetermined number as interfered subbands.

6 Claims, 10 Drawing Sheets

(56) References Cited

OTHER PUBLICATIONS

3rd Generation Partnership Project (3GPP), "Technical Specification Group Radio Access Network; Evolved Universal Terrestrial Radio Access (E-UTRA); Physical layer procedures (Release 8)", 7.2 UE procedure for reporting channel quality indication (CQI), procoding matrix indicator (PMI) and rank indication (RI), p. 23.

3GPP, "Signaling Requirements to Support Semi-Static Frequency Planning for Inter-Cell Interference Mitigation in EUTRA Downlink", 13.1.3, TSG RAN WG1#44, Texas Instruments, Denver, Feb. 13-17, 2006.

3GPP, "Downlink Interference Coordination", 6.2 Interference Mitigation, TSG RAN WG1 Meeting LTE Ad Hoc, Siemens, Cannes, France, Jun. 27-30, 2006.

\* cited by examiner

RADIO BASE STATION AND RADIO COMMUNICATION METHOD

TECHNICAL FIELD

The present invention relates to a radio base station and a radio communication method used in a radio communication system in which a radio terminal measures a radio quality value indicating a radio communication quality and then notifies the radio base station of the radio quality value.

BACKGROUND ART

Frequency resource is limited in a radio communication system. Thus, various techniques have been developed for utilizing the limited frequency resource to a maximum extent. As one of such techniques, a technique is known in which a communication frequency allocated to a radio terminal by a radio base station is dynamically changed in accordance with a radio communication quality of each communication frequency.

In such a technique, the radio terminal measures respective radio communication qualities of a plurality of communication frequencies and notifies the radio base station of radio quality value indicating the measurement result. Based on the radio quality value received from the radio terminal, the radio base station allocates to the radio terminal, a communication frequency with a good radio communication quality from among communication frequencies that can be allocated to the radio terminal. Thus, the radio terminal can perform radio communications with the radio base station using the communication frequency with a good radio communication quality. Accordingly, stable and high-speed radio communications can be achieved.

In LTE (Long Time Evolution), which is a radio communication system standardized in 3GPP (3rd Generation Partnership Project), radio quality value on a predetermined number of communication frequencies with the highest radio communication qualities is notified to the radio base station from the radio terminal (see Non-Patent Document 1).

PRIOR ART DOCUMENT

Non-Patent Document

Non-Patent Document 1: 3GPP TS 36.213 V8.3.0 "7.2 UE procedure for reporting channel quality indication (CQI), precoding matrix indicator (PMI) and rank indication (RI)", [online], [searched on Oct. 17, 2009], <URL:http://www.3gpp.org/ftp/Specs/archive/36_series/36.213/36213-830.zip>

SUMMARY OF INVENTION

In a situation where the amount of traffic received and transmitted by the radio base station is large, e.g., when the radio base station performs radio communications with a large number of radio terminals, the radio base station cannot always allocate a communication frequency with a good radio communication quality to the radio terminal.

Here, if the radio base station knows in advance a communication frequency of which a level of interference from an interference source is high (hereinafter, referred to as an interfered frequency), countermeasure can be taken such as excluding the communication frequency from allocated frequencies, and stable and high-speed radio communications can be surely achieved.

However, it is difficult for the radio base station to detect the interfered frequency with high accuracy in a conventional radio communication system. Accordingly, there has been a problem that sufficient countermeasure against interference cannot be taken in the radio base station.

In this respect, an objective of the present invention is to provide a radio base station and a radio communication method with which an interfered frequency with a high interference level from an interference source can be detected easily and with high accuracy.

In order to solve the problem described above, the present invention has the following features. First of all, according to a first feature of the present invention, there is provided a radio base station (radio base station 1A) which performs radio communications with a radio terminal (radio terminal 2A) configured to measure a radio communication quality (SNR or CNR) in each of a plurality of predetermined communication frequencies (subbands), the radio base station comprising: a receiver (radio communication unit 110) configured to receive a radio quality value (CQI) indicating the radio communication quality of each of the communication frequencies for a plurality of times from the radio terminal, or configured to receive the radio quality value from a plurality of radio terminals including the radio terminal; a counting unit (counting unit 122) configured to count the number of times the receiver receives the radio quality value that degrades below a predetermined threshold value for each of the plurality of communication frequencies; and a detector (interfered subband detector 123) configured to detect a communication frequency for which the number of times counted by the counting unit reaches the predetermined number of times from among the plurality of communication frequencies, as an interfered communication frequency that receives at least a predetermined level of interference from an interference source.

According to the aforementioned feature, it is possible to exclude a momentary degradation of a radio communication quality and thereby to detect an interfered subband with high accuracy by detecting as the interfered communication frequency a communication frequency for which the number of times the receiver receives the radio quality value that degrades below the predetermined threshold value reaches the predetermined number of times. This is because the communication frequency of which the radio quality value received from the radio terminal is low has a possibility of receiving the interference from the interference source.

In addition, the aforementioned feature employs an existing method in which the radio terminal notifies the radio base station of the radio quality value, and thus can be achieved without a major change in the specification of the radio communication system. Thus, the interfered frequency can be detected easily.

Accordingly, with the radio base station according to the first feature, the interfered frequency of which the level of interference from the interference source is high can be detected easily and with high accuracy.

A second feature of the present invention relates to the first feature and is summarized as follows. The radio base station further comprises an acquiring unit (information acquiring unit 121) configured to acquire terminal location information indicating at least one of a location of the radio terminal and a distance between the radio terminal and the radio base station, wherein the counting unit counts, on the basis of the terminal location information acquired by the acquiring unit, the number of times the receiver receives the radio quality value which is transmitted from the radio terminal located in a predetermined area and which degrades below the predetermined threshold value.

A third feature of the present invention relates to the second feature and is summarized as follows. The predetermined area is an edge portion of a communication area of the radio base station.

A fourth feature of the present invention relates to the first feature and is summarized as follows. The radio base station further comprising an interference source identifying unit (interference source identifying unit 125) configured to identify an interference source base station when the interfered subband is detected by the detector, the interference source base station being another radio base station serving as the interference source, wherein the terminal location information is information indicating a location of the radio terminal, the acquiring unit further acquires base station location information on locations of other radio base stations located within a predetermined range from the radio base station, and the interference source identifying unit identifies the interference source base station on the basis of the terminal location information and the base station location information.

A fifth feature of the present invention relates to the first feature and is summarized as follows. The receiver receives the radio quality value indicating a predetermined number of lowest radio communication qualities from among the radio communication qualities respectively measured for the plurality of communication frequencies by the radio terminal.

According to a first feature of the present invention, there is provided a radio communication method for performing radio communications with a radio terminal configured to measure a radio communication quality in each of a plurality of predetermined communication frequencies, the method comprising the steps of: receiving a radio quality value indicating the radio communication quality of each of the communication frequencies for a plurality of times from the radio terminal, or receiving the radio quality value from a plurality of radio terminals including the radio terminal; counting the number of times the receiver receives the radio quality value that degrades below a predetermined threshold value for each of the plurality of communication frequencies; and detecting a communication frequency for which the number of times counted by the counting unit reaches the predetermined number of times from among the plurality of communication frequencies, as an interfered communication frequency that receives at least a predetermined level of interference from an interference source.

According to the present invention, it is possible to provide a radio base station and a radio communication method with which an interfered frequency with a high interference level from an interference source can be detected easily and with high accuracy.

DESCRIPTION OF EMBODIMENTS

Next, descriptions will be given of radio communication systems according to first, second and other embodiments of the present invention with reference to the drawings. Note that, in the following description of the drawings, same or similar reference signs denote same or similar portions.

First Embodiment

In the first embodiment, descriptions are given of (1) a schematic configuration of a radio communication system, (2) a configuration of a radio base station, (3) an operation of the radio communication system, and (4) advantageous effects.

(1) Schematic Configuration of Radio Communication System

Figure 1:
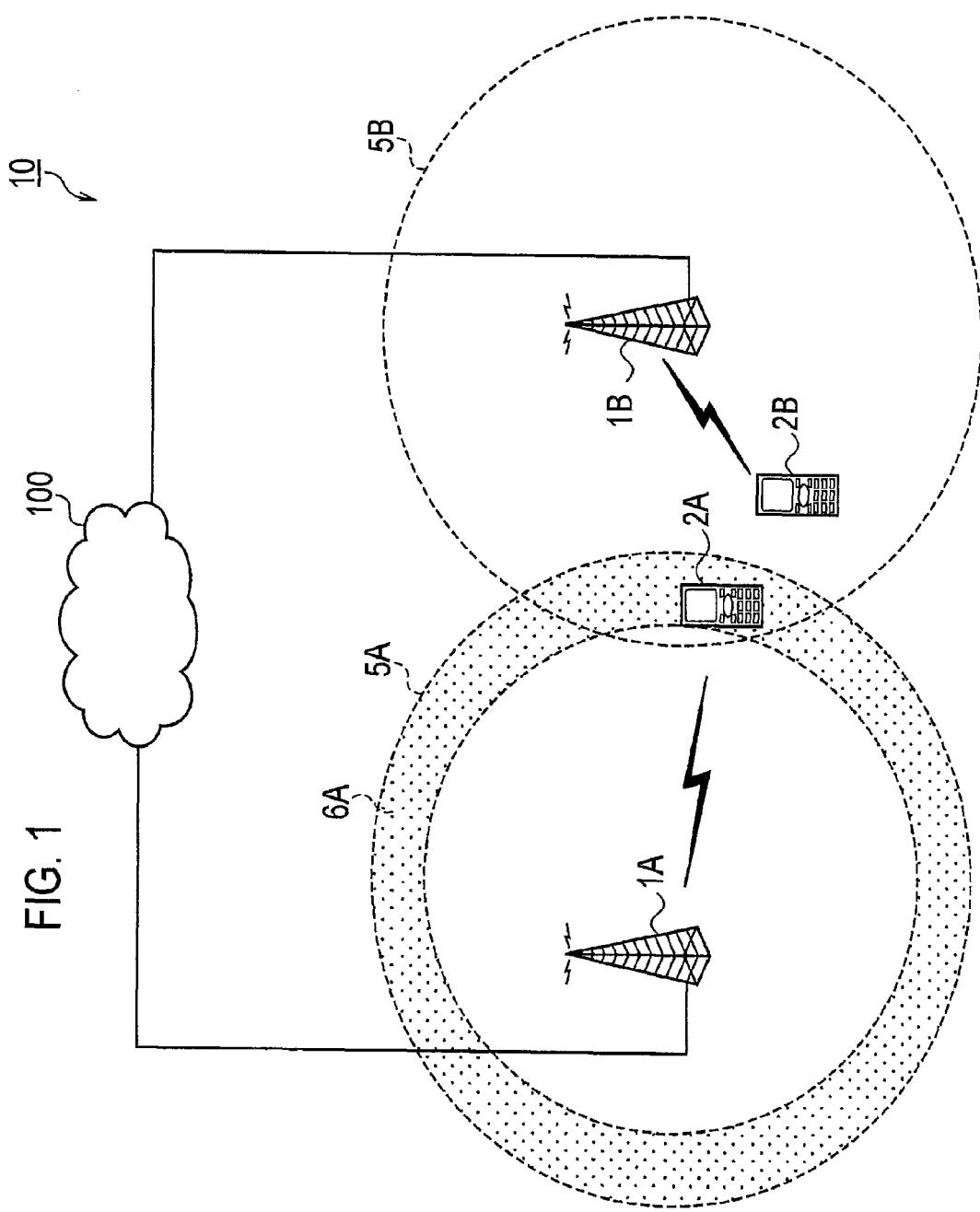
FIG. 1 is a schematic configuration diagram of a radio communication system according to a first embodiment.

FIG. 1 is a schematic configuration diagram of a radio communication system 10 according to the first embodiment. The radio communication system 10 has a configuration based on the LTE standard. Specifically, orthogonal frequency division multiple access (OFDMA) scheme, which is one of the multi-carrier communication schemes, is used in the radio communication system 10. In the OFDMA scheme, a communication channel called a subchannel is formed of multiple subcarriers and the communication channel is allocated to a radio terminal.

As shown in FIG. 1, the radio communication system 10 includes a radio base station 1A, a radio base station 1B, and multiple radio terminals 2A and 2B.

The radio base station 1A (first radio base station) forms a communication area 5A in which communications with a radio terminal is possible. The communication area 5A is within a range of radio communication of the radio base station 1A and is also called a cell.

The radio terminal 2A is located within the communication area 5A and performs radio communications with the radio base station 1A through a communication channel allocated by the radio base station 1A. A large number of radio terminals 2A may be located in the communication area 5A and perform radio communications with the radio base station 1A instead of a single radio terminal 2A as shown in FIG. 1.

When a large number of radio terminals 2A perform radio communications with the radio base station 1A as described above, radio communication resource of the radio base station 1A falls short.

The radio base station 1B (second radio base station) forms a communication area 5B and performs radio communications with the radio terminal 2B located in the communication area 5B. A large number of radio terminals in addition to the radio terminal 2B may be located in the communication area 5B.

The radio base station 1A and the radio base station 1B are connected to a backbone network 100 that is a wired communication network. The radio base station 1A and the radio base station 1B can communicate with each other through the backbone network 100.

The communication area 5A formed by the radio base station 1A and the communication area 5B formed by the radio base station 1B are so-called neighboring cells that partly overlap with each other. In the example shown in FIG. 1, the radio terminal 2A is located in the overlapping area of the communication area 5A and the communication area 5B.

The communication channel allocated to the radio terminal 2A by the radio base station 1A and the communication channel allocated to the radio terminal 2B by the radio base station 1B are communication channels of the same frequency or of neighboring frequencies, for example. The radio terminal 2A, which is located in an edge portion (hereinafter, referred to as "area edge") 6A of the communication area 5A that overlaps with the communication area 5B, is largely affected by the interference from the radio base station 1B.

More specifically, a radio signal transmitted from the radio base station 1B to the radio terminal 2B is received not only by the radio terminal 2B but also by the radio terminal 2A. In the following, radio communications between the radio base station 1A and the radio terminal 2A are mainly described and a radio signal received by the radio terminal 2A from the radio base station 1B is referred to as an interference signal.

In the OFDMA scheme, the communication channel allocated to the radio terminal 2A by the radio base station 1A can be dynamically changed. Moreover, the radio communication system 10 employs an adaptive modulation. In the adaptive modulation, radio communications can be achieved with faster modulation scheme with the better radio communication quality (SNR and CINR) between the radio base station 1A and the radio terminal 2A.

In view of the above, in the radio communication system 10, the radio terminal 2A measures the communication quality and notifies the radio base station 1A of the measured radio communication quality. Specifically, the radio terminal 2A measures the radio communication quality of each frequency called a subband in which multiple subcarriers are gathered together. In the LTE standard, the entire frequency band available in the radio communication system 10 is divided into about 50 subbands. Moreover, in the LTE standard, a value called CQI (Channel Quality Indication) is used as an index of the radio communication quality. In the 3GPP standard specification "3GPP TS 36.213 V8.3.0", a scheme is defined in which a radio terminal notifies a radio base station of CQIs of M subbands with the highest CQIs. Thus, the radio base station can determine a subband suitable for the radio terminal.

In the first embodiment, the radio terminal 2A extracts lowest N CQIs for example, from among the CQIs respectively measured for the multiple subbands and notifies the radio base station 1A of CQI information indicating the extracted lowest N CQIs.

Figure 2:
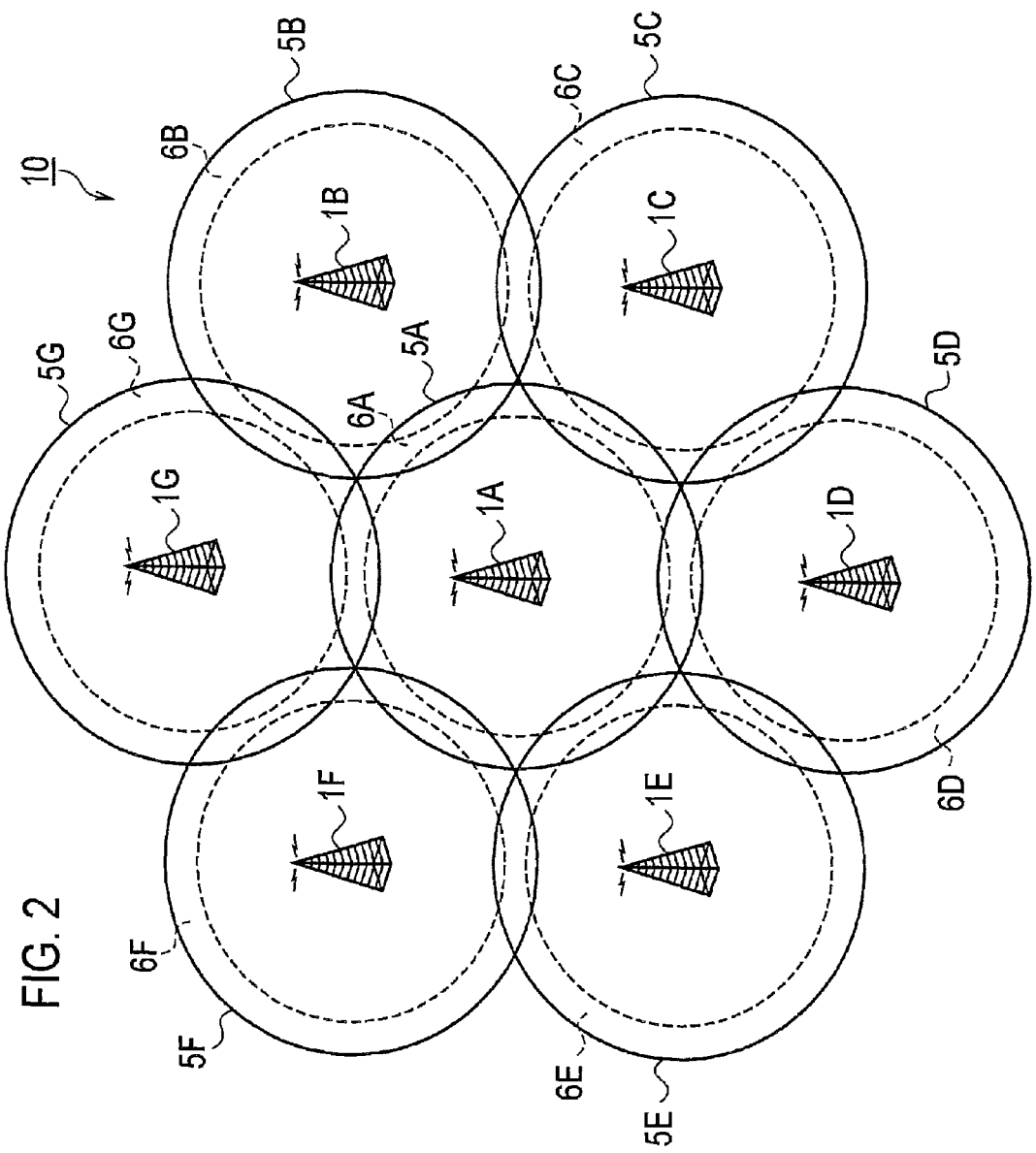
FIG. 2 is a diagram for explaining neighboring radio base stations.

As shown in FIG. 2, multiple neighboring radio base stations 1B to 1G are installed at the periphery of the radio base station 1A. The area edge 6A of the communication area 5A formed by the radio base station 1A overlaps with area edges 6B to 6G of the respective communication areas 5B to 5G respectively formed by the neighboring radio base stations 1B to 1G.

Based on the CQI information received from the radio terminal 2A, the radio base station 1A detects an interfered subband which is largely interfered by the neighboring radio base stations 1B to 1G from among the multiple subbands and notifies the neighboring radio base stations 1B to 1G of information on the interfered subband. The neighboring radio base stations 1B to 1G perform processing to reduce the interference in accordance with the notified information. In the following, of the neighboring radio base stations 1B to 1G, the radio base station 1B is representatively described.

(2) Configuration of Radio Base Station

Next, (2.1) a configuration of the radio base station 1A and (2.2) a configuration of the radio base station 1B are described.

(2.1) Configuration of Radio Base Station 1A

Figure 3:
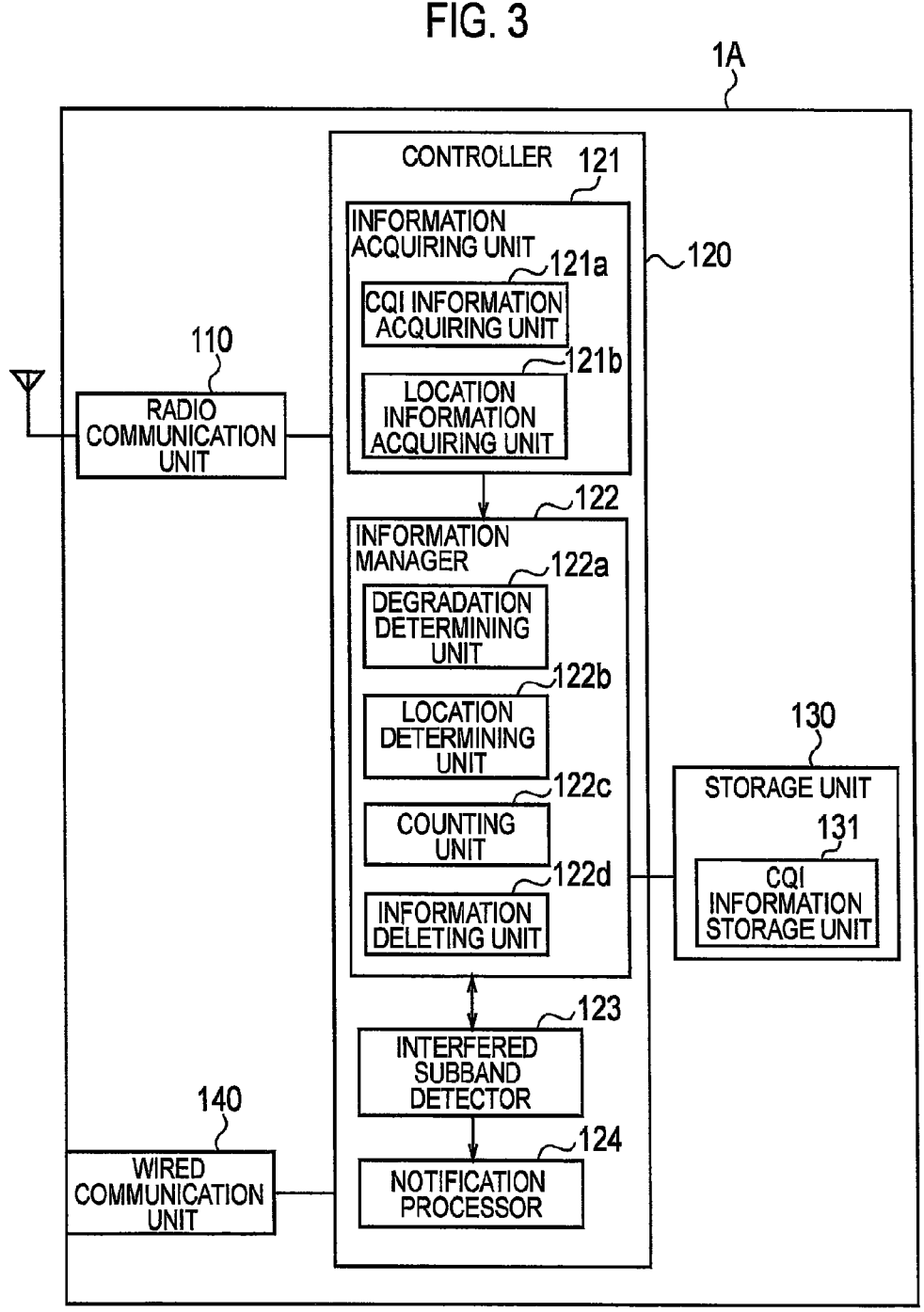
FIG. 3 is a functional block diagram showing a configuration of a radio base station (first radio base station) according to the first embodiment.

FIG. 3 is a functional block diagram showing a configuration of the radio base station 1A according to the first embodiment.

As shown in FIG. 3, the radio base station 1A includes a radio communication unit 110, a controller 120, a storage unit 130 and a wired communication unit 140.

The radio communication unit 110 includes an LNA (Low Noise Amplifier), a power amplifier, an up-converter, a down-converter, and the like and receives and transmits a radio signal based on the OFDMA. The radio communication unit 110 forms a quality information receiver configured to receive the CQI information (quality information) from the radio terminal 2A.

The wired communication unit 140 serves as an interface with the backbone network 100. The controller 120 is formed of a CPU for example, and controls various functions of the radio base station 1A. The storage unit 130 is formed of a memory for example and stores various pieces of information used for the control in the radio base station 1A.

The controller 120 includes an information acquiring unit 121, an information manager 122, an interfered subband detector 123, and a notification processor 124.

The information acquiring unit 121 includes a location information acquiring unit 121b that acquires location information (terminal location information) indicating the location of the radio terminal 2A and a CQI acquiring unit 121a that acquires CQI information notified from the radio terminal 2A. The CQI acquiring unit 121a receives CQI information from a single radio terminal 2A for multiple times or receives the CQI information from multiple radio terminals 2A. The location information acquiring unit 121b acquires location information indicating at least the location of the radio terminal 2A or the distance between the radio terminal 2A and the radio base station 1A.

The information manager 122 stores the CQI information acquired by the information acquiring unit 121 in a CQI information storage unit 131 of the storage unit 130 and manages the CQI information.

The information manager 122 includes a degradation determining unit 122a, a location determining unit 122b, a counting unit 122c, and an information deleting unit 122d. Based on the CQI information, the degradation determining unit 122a determines whether or not a subband of which the CQI is degraded below a threshold value exists in the multiple subbands. Based on the terminal location information, the location determining unit 122*b* determines whether or not the radio terminal 2A is located at the area edge 6A of the radio base station 1A. The counting unit 122*c* counts the number of times the CQI degrades below the threshold value for each of the multiple subbands. The information deleting unit 122*d* deletes the old information from among the CQI information pieces stored in the CQI information storage unit 131.

The interfered subband detector 123 detects the interfered subband by using the information managed by the information manager 122. The notification processor 124 notifies the neighboring radio base stations 1B to 1G of interference information indicating the interfered subband detected by the interfered subband detector 123. Thus, the notification processor 124 forms an interference information notifying unit in the first embodiment.

Processing performed by each of the functional blocks of the radio base station 1A is described in detail below. Specifically, descriptions are given of (2.1.1) acquisition of terminal location information, (2.1.2) acquisition of CQI information, (2.1.3) management of CQI information, (2.1.4) detection of interfered subband and (2.1.5) notification of interference information.

(2.1.1) Acquisition of Terminal Location Information

The location information acquiring unit 121*b* acquires the location information of the radio terminal 2A using any one of the following methods A to C.

A. The radio terminal 2A measures the self location using location information detection means such as a GPS installed in the radio terminal 2A and notifies the radio base station 1A of the location information. As the timing at which the radio terminal 2A notifies the location information, notifying upon initial connection to the radio base station 1A, notifying at predetermined intervals, notifying upon change of the location information, and the like may be considered.

B. Location estimation with the radio base station 1A measuring reception power, Doppler frequency, and the like of the electronic wave transmitted by the radio terminal 2A. In some cases, the location of the radio terminal 2A can be accurately detected from the results of the measurements by multiple base stations.

C. Distance estimation based on the difference between a timing at which the radio base station 1A receives a radio signal transmitted by the radio terminal 2A and a timing at which the radio base station 1A transmits a signal; distance estimation through notification of timing advance (TA) information performed by the radio terminal 2A; or the combination of these.

(2.1.2) Acquisition of CQI Information

The CQI information acquiring unit 121*a* can non-periodically acquire a CQI from the radio terminal 2A by requesting it to the radio terminal 2A. Here, a subband with CQI with low measurement result is notified. As the number of CQIs to be notified from the radio terminal 2A, the lowest M CQIs, CQIs lower than a predetermined threshold value, or the lowest M CQIs from among the CQIs lower than the predetermined threshold value may be considered. The method of making the radio terminal 2A recognize the criteria (the number M or the threshold value) includes system fix, notifying by broadcast information, notifying by configuration upon initial connection of the radio terminal 2A, and the like.

(2.1.3) Management of CQI Information

In the above described C, the information manager 122 stores the CQI information pieces in the CQI information storage unit 131 with respect to distances of the radio terminal. Alternatively, the information manager 122 may store only the CQI of the radio terminal determined to be located at the area edge 6A by the location determining unit 122*b* in the CQI information storage unit 131.

The information manager 122 stores the CQI information in the CQI information storage unit 131 by any one of the following methods D to E.

D. Method of storing a subband and a CQI together with terminal ID.

E. Method of storing a CQI for each subband.

F. Method of storing the number of times the CQI not larger than the threshold value is notified for each subband.

When the storing methods are arranged in order of amount of memory required, D.>E.>F holds true. The larger amount of information is directly related to the larger amount of memory of the information storage unit 131, but allows the interference detection of a higher level.

In any of the methods, the information deleting unit 122*d* deletes old information pieces after certain time (TBD) has passed because currently received interference cannot be accurately estimated by the determination based on the old information pieces.

Examples of CQI information pieces stored by the method E are shown in Table 1.

TABLE 1

| Subband Number | CQI 1 | CQI 2 | CQI 3 | CQI 4 | CQI 5 | CQI 6 | CQI 7 | CQI 8 |
|---|---|---|---|---|---|---|---|---|
| 1 | xx dB | xx dB | xx dB | xx dB | xx dB | xx dB | | |
| Elapsed Time | 1 | 3 | 4 | 7 | 15 | 16 | | |
| 2 | | | | | | | | |
| Elapsed Time | | | | | | | | |
| 3 | | | | | | | | |
| Elapsed Time | | | | | | | | |
| 4 | | | | | | | | |
| Elapsed Time | | | | | | | | |

In Table 1, a notified CQI and a value corresponding to the elapsed time after the notification are recorded for each of the subbands with the respective subband numbers 1 to 4. The value corresponding to the elapsed time is decremented (subtracted by 1) along with the elapse of time. When the value reaches zero, the CQI with the value is deleted.

(2.1.4) Detection of Interfered Subband

Generally, a subband with a low CQI is estimated to be receiving a higher level of interference. Thus, interfered level can be estimated to be high when the degradation determining unit 122*a* determines that the CQI is not larger than the predetermined threshold value. The interfered subband detector 123 may determine a subband as the interfered subband upon detecting a CQI corresponding to a condition for multiple times is observed using the counting unit 122*c* to eliminate a momentary factor.

When storing information as in the above described F, the counting unit 122*c* counts the number of times a CQI is not larger than the threshold value for each subband. The interfered subband detector 123 determines a subband as the interfered subband when the counted value reaches or exceeds the predetermined number.

Similar determination is possible in the above described E. In this case, since the CQI is stored for each subband, the interfered subband detector 123 may weight each subband by the level of CQI to thereby determine a high interference even when the counted number of times the CQI is not larger than the threshold value is small.

In the D., a radio terminal from which each CQI is notified can also be identified. Thus, when a CQI of a specific radio terminal is low, an individual factor such as malfunctioning of the terminal can be identified.

(2.1.5) Notification of Interference Information

When the interfered subband detector 123 detects an interfered subband, the notification processor 124 notifies the neighboring radio base stations 1B to 1G of the interference information through the backbone network 100. For example, the interference information includes a subband number for identifying the interference subband. Notified one of the neighboring radio base stations 1B to 1G avoids using the interfered subband or uses the interfered subband with low transmission power in accordance with their traffic conditions. The notification processor 124 may notify instruction message with strong coercive force that forces the use of the interfered subband to be stopped or an output to be lowered.

(2.2) Configuration of Radio Base Station 1B

Figure 4:
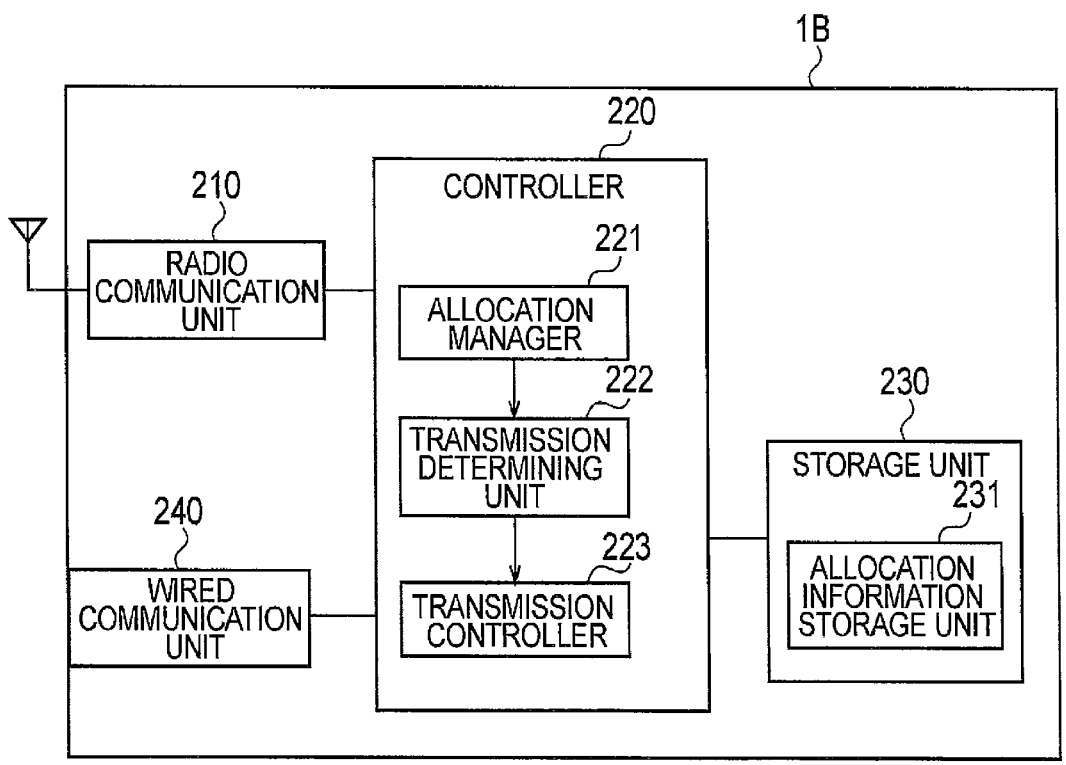
FIG. 4 is a functional block diagram showing a configuration of a radio base station (second radio base station) according to the first embodiment.

Next, (2.1) a configuration of the radio base station 1B is described. FIG. 4 is a functional block diagram showing a configuration of a radio base station 1B.

As shown in FIG. 4, the radio base station 1B includes a radio communication unit 210, a controller 220, a storage unit 230 and a wired communication unit 240. The radio communication unit 210 includes an LNA, a power amplifier, an up-converter, a down-converter, and the like and receives and transmits a radio signal based on the OFDMA. The wired communication unit 240 serves as an interface with the backbone network 100. The wired communication unit 240 serves as an interference information receiver that receives the interference information through the backbone network 100.

The controller 220 is formed of a CPU for example and controls various functions of the radio base station 1B. The storage unit 230 is formed of a memory for example and stores various pieces of information used for the control in the radio base station 1B.

The controller 220 includes an allocation manager 221, a transmission determining unit 222, and a transmission controller 223. The allocation manager 221 allocates a communication channel to the radio terminal 2B and manages the allocated communication channel and information on the subband including the communication channel. The allocation information managed by the allocation manager 221 is stored in the storage unit 230 (allocation information storage unit 231).

The transmission determining unit 222 identifies the interfered subband based on the interference information received from the radio base station 1A and determines whether or not an interference signal for which the interfered subband is used is transmitted by the radio base station 1B. More specifically, the transmission determining unit 222 determines whether or not a communication channel of a frequency corresponding to the interference subband is allocated to the radio terminal 2B, based on the allocation information managed by the allocation manager 221. The transmission determining unit 222 determines that the radio base station 1B is transmitting the interference signal, when the communication channel of the frequency corresponding to the interference subband is allocated to the radio terminal 2B.

The transmission controller 223 controls the radio communication unit 210 in accordance with the result of determination by the transmission determining unit 222. The transmission controller 223 performs any one of transmission power lowering and transmission stop for the interference signal when the transmission determining unit 222 determines that the radio base station 1B is transmitting the interference signal.

(3) Operation of Radio Communication System

Next, an operation of the radio communication system 10 according to the first embodiment is described. Specifically, descriptions are given of (3.1) an overall schematic operation, (3.2) an operation of the radio base station 1A, and (3.3) an operation of the radio base station 1B.

(3.1) Overall Schematic Operation

Figure 5:
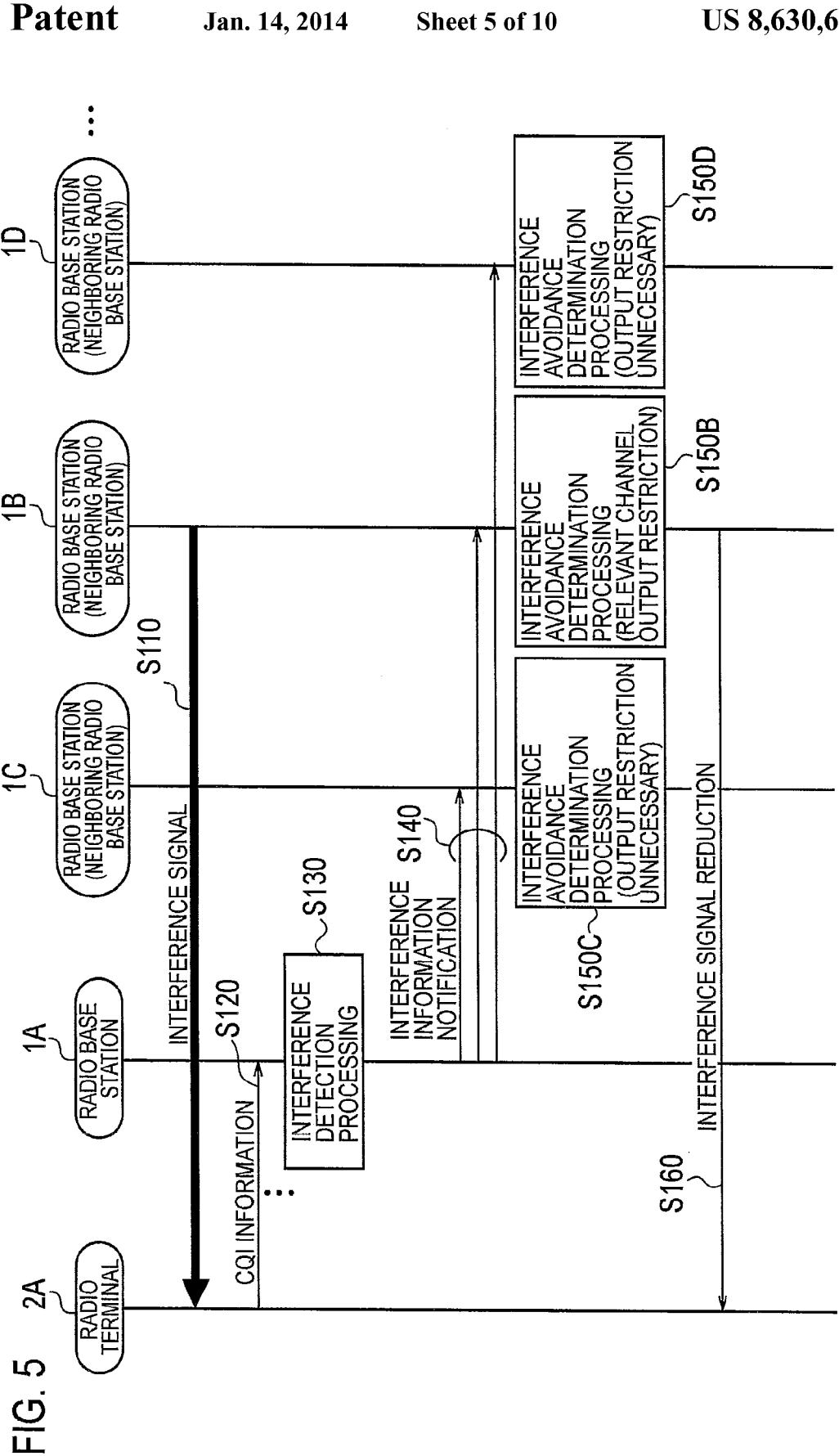
FIG. 5 is a sequence diagram showing a schematic operation sequence of the radio communication system according to the first embodiment.

FIG. 5 is a sequence diagram showing a schematic operation sequence of the radio communication system 10 according to the first embodiment.

In Step S110, the radio communication unit 210 of the radio base station 1B is transmitting the interference signal to the radio base station 1A.

In Step S120, the radio terminal 2A notifies the radio base station 1A of the CQI information. The radio terminal 2A thereafter notifies the radio base station 1A of the CQI information periodically. The CQI information acquiring unit 121*a* of the radio base station 1A acquires the notified CQI information. The location information acquiring unit 121*b* acquires the location information of the radio terminal 2A using any one of the methods A to C.

In Step S130, the information manager 122 and the interfered subband detector 123 of the radio base station 1A perform the interference detection processing for detecting an interfered subband. The interference detection processing will be described in detail later.

In Step S140, the notification processor 124 of the radio base station 1A notifies the neighboring radio base stations 1B to 1G of the interference information through the backbone network 100 when the interfered subband is detected.

In Step 150B, Step 150C, and Step 150D, the transmission determining unit 222 and the transmission controller 223 of each of the neighboring radio base stations 1B to 1G determines whether or not to perform interference avoidance processing.

In Step S160, the transmission determining unit 222 of the radio base station 1B determines that the interference signal is transmitted by the radio base station 1B and the transmission controller 223 performs output restriction (transmission power lowering herein) on the relevant communication channel.

(3.2) Operation of Radio Base Station 1A

Figure 6:
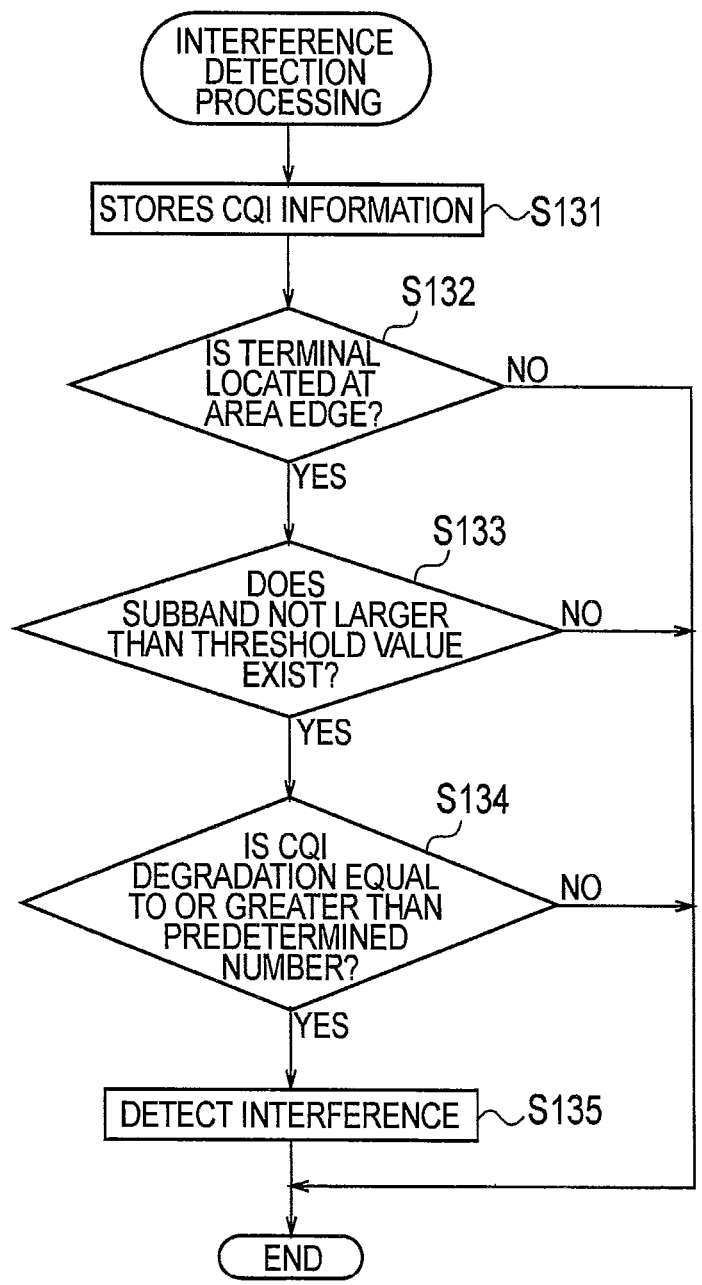
FIG. 6 is a flowchart showing an operation of the radio base station (first radio base station) according to the first embodiment, more specifically, a detail of Step S130 shown in FIG. 5.

FIG. 6 is a flowchart showing an operation of the radio base station 1A according to the first embodiment, more specifically, a detail of Step S130 (interference detection processing) shown in FIG. 5.

In Step S131, the information manager 122 stores the CQI information in the CQI information storage unit 131 of the storage unit 130.

In Step S132, the location determining unit 122*b* determines whether the radio terminal 2A is located at the area edge 6A based on the terminal location information. The location determination by the location determining unit 122*b* requires information on the area edge 6A. The information is assumed to be pre-stored in the storage unit 130. When the radio terminal 2A is determined to be located at the area edge 6A, the process proceeds to Step S133.

In Step S133, the degradation determining unit 122*a* determines whether or not a subband of which the CQI is degraded below the threshold value exists in the multiple subbands based on the CQI information. The counting unit 122*c* refers to the CQI information storage unit 131 and counts the number of times the CQI is degraded below the threshold value for the degraded subband. When it is determined that the subband of which the CQI is degraded below the threshold value exists, the process proceeds to Step S134.

In Step S134, when the number of times counted by the counting unit 122c for the degraded subband reaches a predetermined number (S134; YES), the interfered subband detector 123 detects the degraded subband as the interfered subband (Step S135).

(3.3) Operation of Radio Base Station 1B

Figure 7:
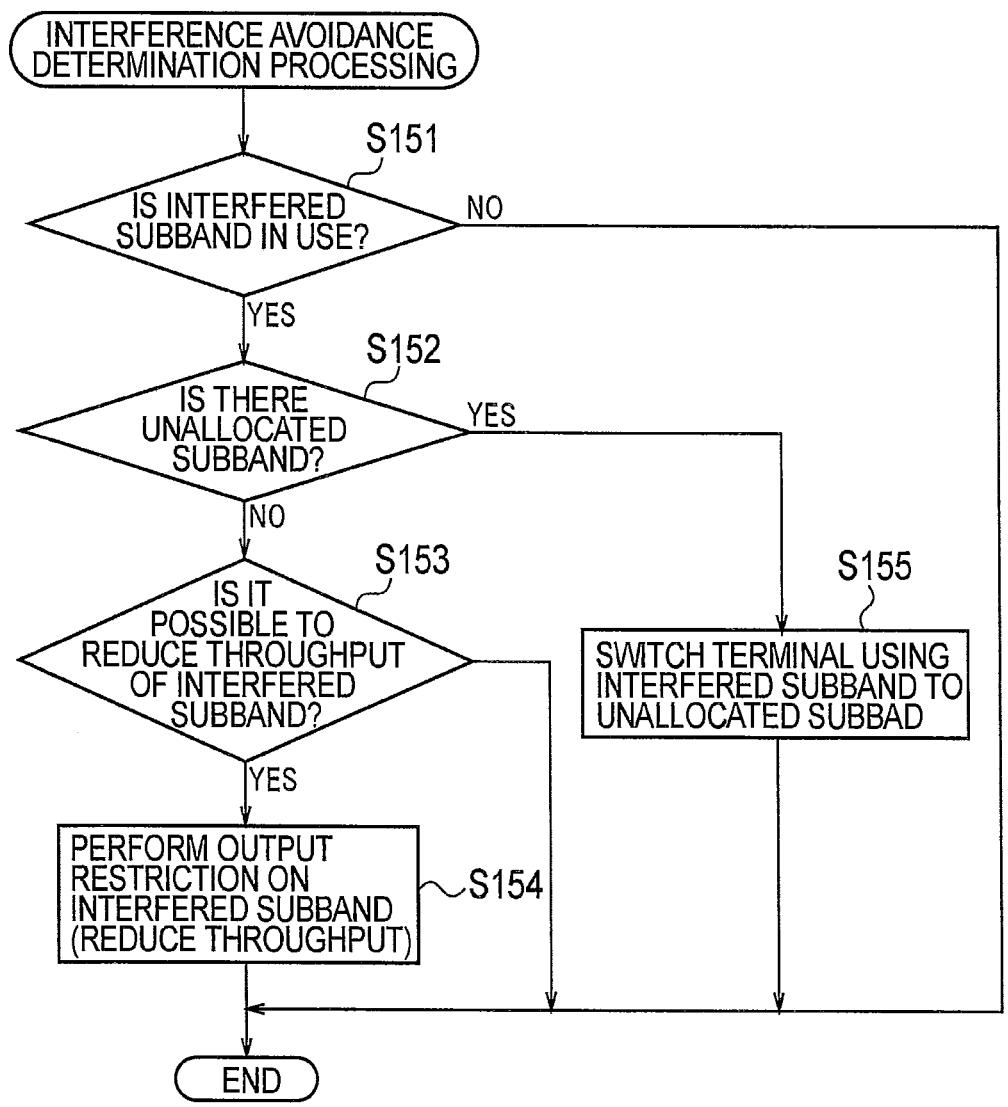
FIG. 7 is a flowchart showing an operation of the radio base station (second radio base station) according to the first embodiment, more specifically, a detail of Step S150B shown in FIG. 5.

FIG. 7 is a flowchart showing an operation of the radio base station 1B, more specifically, a detail of Step S150B (interference avoidance determination processing) shown in FIG. 5.

In Step S151 the transmission determining unit 222 determines whether or not the communication channel of a frequency corresponding to the interfered subband is used based on the allocation information managed by the allocation manager 221. When it is determined that the communication channel of the frequency corresponding to the interfered subband is used, the process proceeds to Step S152.

In Step S152, the transmission controller 223 determines whether or not there is an unallocated subband (or communication channel) in the subbands except for the interfered subband based on the allocation information managed by the allocation manager 221. The processing proceeds to Step S155 if it is determined that there is an unallocated subband (communication channel), whereas the process proceeds to Step S153 if it is determined that there is no unallocated subband (communication channel).

In Step S155, the transmission controller 223 stops using the communication channel (interfered subband) that has been allocated to the radio terminal 2B, i.e., stops transmitting the interference signal and reallocates the communication channel corresponding to the unallocated subband to the radio terminal 2B. In Step S153, the transmission controller 223 determines whether or not the throughput for the radio terminal 2B can be lowered. For example, it is determined that the throughput can be lowered when the amount of data destined to the radio terminal 2B is small.

In Step S154, the transmission controller 223 continues the use of the communication channel (interfered subband) that has been allocated to the radio terminal 2B but lowers the transmission power for the communication channel. In this case, a low-speed demodulation scheme is used and thus the throughput is lowered. Still, the influence of the interference to the radio terminal 2A can be reduced.

(4) Advantageous Effects

In the first embodiment, the notification processor 124 notifies the radio base station 1B of the interference information when the interfered subband is detected. When it is determined that the radio base station 1B is transmitting the interference signal, the transmission controller 223 of the radio base station 1B performs any one of the transmission power lowering and the transmission stop for the transmission of the interference signal. Thus, the CQI of the interfered subband is improved.

Accordingly, even when the subband (interfered subband) of which the CQI is degraded is allocated to the radio terminal 2A, the CQI of the subband can be improved and the stable and high-speed radio communications can be achieved.

In the situation where the amount of traffic transmitted and received by the radio base station is large and thus causes the communication resource shortage, the subband (interfered subband) of which the CQI is degraded is likely to be allocated to the radio terminal 2A. Thus, the present invention is especially effective in such a situation.

In the first embodiment, the interfered subband detector 123 detects a subband of which CQI is degraded as the interfered subband when the location determining unit 122b determines that the radio terminal 2A is located at the area edge 6A and the degradation determining unit 122a determines that the subband with degraded CQI exists. As shown in FIG. 1 and FIG. 2, the area edge 6A is an area where a radio terminal is likely to be affected by the interference. Thus, the interfered subband can be more accurately detected by taking into consideration whether a radio terminal is at the area edge 6A.

In the first embodiment, the interfered subband detector 123 detects a subband of which CQI is degraded as the interfered subband when the degradation determining unit 122a determines that a subband with degraded CQI exists and the number of times counted by the counting unit 122c for the subband with the degraded CQI reaches the predetermined number. Thus, the interfered subband can be even more accurately detected with a momentary degradation of CQI excluded.

In the first embodiment, the radio terminal 2A extracts predetermined number of lowest CQIs from the CQIs measured for respective multiple subbands and notifies the radio base station 1A of the CQI information indicating the predetermined number of extracted lowest CQIs. Thus, the radio base station 1A can determine the degraded subband while an information amount of the CQI information can be reduced compared with the case where the CQIs of all the subbands are transmitted.

In the first embodiment, the transmission controller 223 stops using the subband (interfered subband) that has been allocated to the radio terminal 2B when the transmission determining unit 222 determines that the radio base station 2B is transmitting the interference signal, and reallocates the communication channel corresponding to the unallocated subband to the radio terminal 2B. Thus, the communications with the radio terminal 2B can be continued while avoiding the interference more surely.

In the first embodiment, if it is determined that there is no unallocated subband, the transmission controller 223 continues the use of the subband (interfered subband) that has been allocated to the radio terminal 2B but performs the transmission power lowering. Thus, the communications with the radio terminal 2B can be continued while the influence of the interference is lowered even if there is no unallocated subband.

Second Embodiment

As a second embodiment, an embodiment is described in which a radio base station serving as an interference source is identified from among the neighboring radio base stations 1B to 1G in addition to the configuration and the operation described in the first embodiment. In the following, descriptions are given of (1) a configuration of a radio base station, (2) an overall schematic operation, (3) an operation of the radio base station, and (4) advantageous effects. Note that descriptions overlapping with those in the first embodiment are omitted.

(1) Configuration of Radio Base Station

Figure 8:
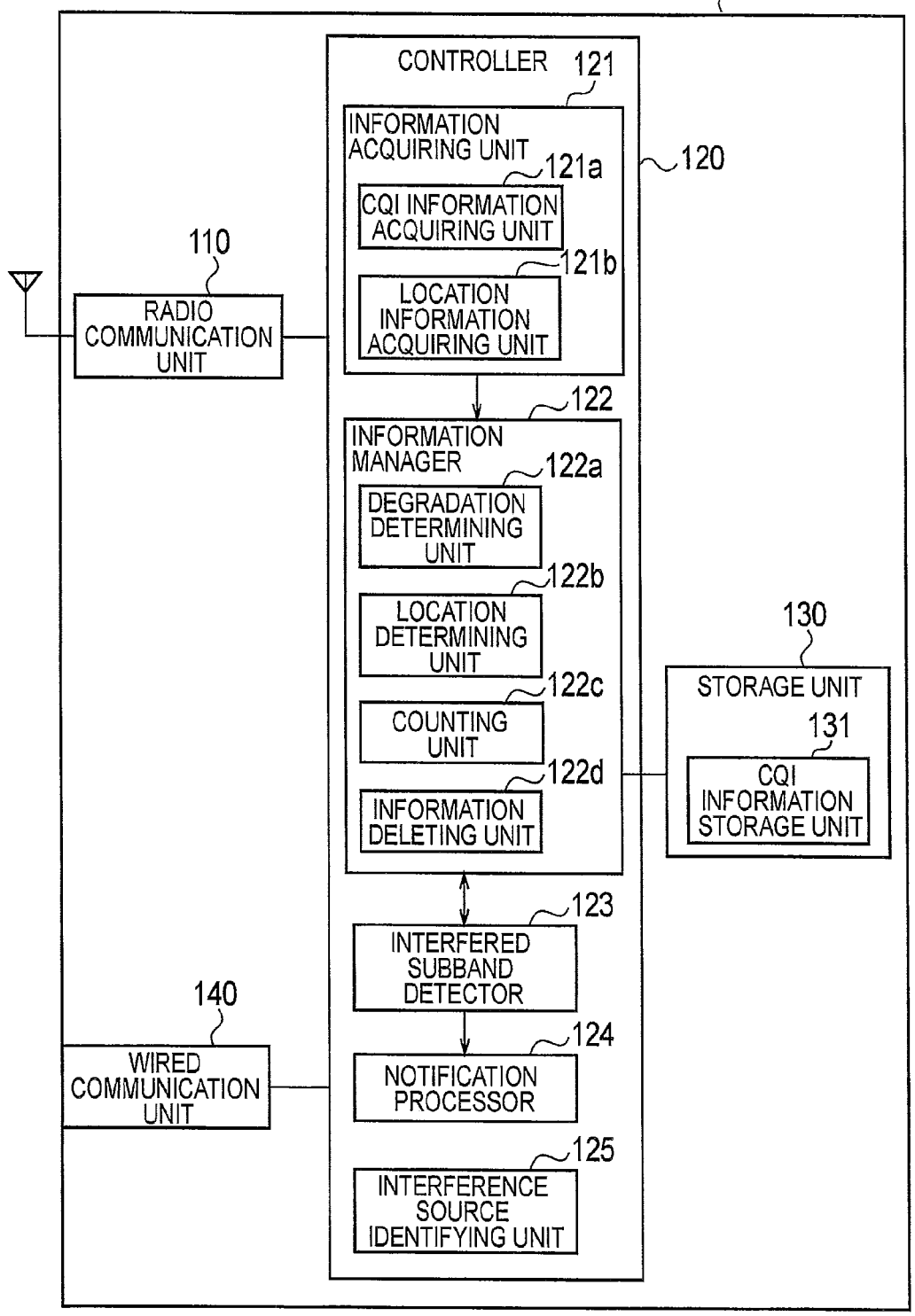
FIG. 8 is a functional block diagram showing a configuration of a radio base station according to a second embodiment.

FIG. 8 is a functional block diagram showing a configuration of a radio base station 1A according to the second embodiment.

As shown in FIG. 8, the radio base station 1A further includes an interference source identifying unit 125 in addition to the configuration of the first embodiment. The interference source identifying unit 125 identifies a radio base station (hereinafter, referred to as interference source radio base station) transmitting an interference signal to the radio terminal 2A, thereby serving as the interference source from among the neighboring radio base stations 1B to 1G when the interfered subband detector 123 detects the interfered subband.

Upon storing the CQI information in the CQI information storage unit 131, the information manager 122 according to the second embodiment estimates the radio base station nearest to the radio terminal 2A from among the neighboring radio base stations 1B to 1G based on the location information of each radio terminal 2A and groups the CQIs for each of the neighboring radio base stations 1B to 1G. Due to the storing in the grouping manner, the interference source detector 125 can identify the interference source base station related to the interfered subband detected by the interfered subband detecting unit 123.

To estimate the radio base station nearest to the radio terminal 2A, location information (hereinafter, base station location information) for each of the neighboring radio base stations 1B to 1G is required. The base station location information is pre-stored in the storage unit 130. Thus, the location information acquiring unit 121b can acquire the base station location information from the storage unit 130 and use it for the estimation of the radio base station nearest to the radio terminal 2A.

Alternatively, information indicating the communication area of each of the neighboring radio base stations 1B to 1G may be used as the base station location information. In this case, the interference source identifying unit 125 identifies as the interference source base station, a neighboring radio base station that forms a communication area including the location of the radio terminal 2A from among the neighboring radio base stations 1B to 1G.

The notification processor 124 transmits an instruction message instructing any one of the transmission power lowering and the transmission stop for the interference signal to the interference source base station identified by the interference source identifying unit 125. This happens when the interfered subband detector 123 detects the interfered subband. More specifically, in the second embodiment, the notification processor 124 serves as an instructing unit that instructs any one of the transmission power lowering and the transmission stop for the interference signal.

(2) Overall Operation

Figure 9:
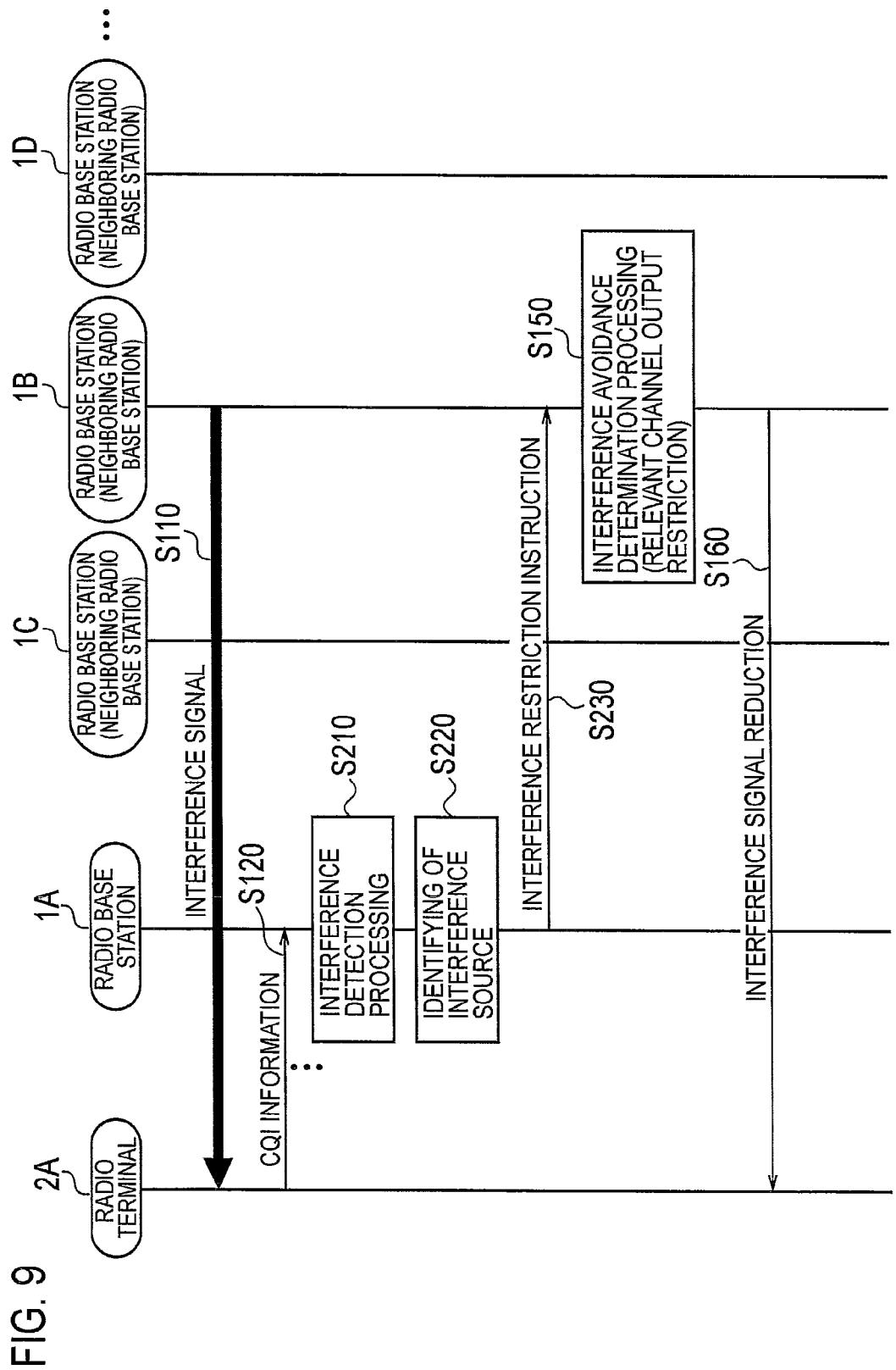
FIG. 9 is a sequence diagram showing a schematic operation sequence of the radio communication system according to the second embodiment.

FIG. 9 is a sequence diagram showing a schematic operation sequence of a radio communication system 10 according to the second embodiment. In FIG. 9, operations in Steps other than those in Steps S210 to S230 are the same and thus, the description is given of Steps S210 to S230.

In Step S210, the information manager 122 and the interfered subband detector 123 of the radio base station 1A perform interference detection processing for detecting the interfered subband. The interference detection processing is described in detail later.

In Step S220, the interference source identifying unit 125 of the radio base station 1A identifies the interference source base station from among the neighboring radio base stations 1B to 1G. Here, the radio base station 1B is assumed to be identified as the interference source base station.

In Step S230, the notification processor 124 of the radio base station 1A transmits the interference restriction signal to only the radio base station 1B through the backbone network 100 when the interference subband is detected.

(3) Operation of Radio Base Station

Figure 10:
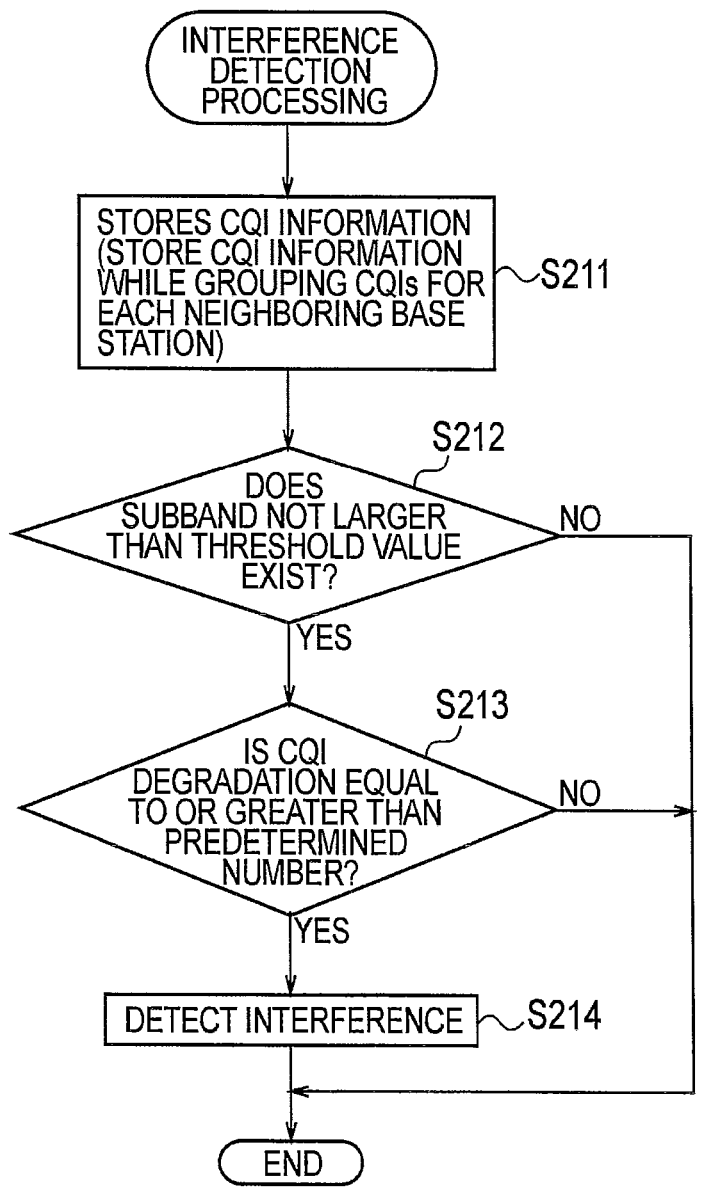
FIG. 10 is a flowchart showing an operation of the radio base station (first radio base station) according to the second embodiment, more specifically, a detail of Step S210 shown in FIG. 9.

FIG. 10 is a flowchart showing an operation of the radio base station 1A according to the second embodiment, more specifically, a detail of Step S210 (interference detection processing) shown in FIG. 9. In FIG. 10, operations in Steps other than that in Step S211 are the same and thus, the description is given of Step S211. In Step S211, the information manager 122 stores the CQI information in the CQI information storage unit 131 of the storage unit 130. At this point, the information manager 122 estimates the radio base station nearest to the radio terminal 2A from among the neighboring radio base stations 1B to 1G based on the location information of each radio terminal 2A while grouping the CQIs for each of the neighboring radio base stations 1B to 1G.

(4) Advantageous Effects

In the second embodiment, the notification processor 124 transmits an instruction message instructing any one of the transmission power lowering and the transmission stop for the interference signal to the interference source base station identified by the interference source identifying unit 125. This happens when the interfered subband detector 123 detects the interfered subband. Thus, the amount of messages used for the notification can be reduced compared with the first embodiment in which the notification is given to all of the neighboring radio base stations 1B to 1G. Furthermore, in the first embodiment, there is a possibility that the interference avoidance operation is performed by the neighboring radio base stations 1B to 1G that is actually not the interference source. In the second embodiment such a possibility can be lowered.

Other Embodiments

As described above, the present invention has been described by using the embodiments of the present invention.

However, it should not be understood that the description and drawings which constitute part of this disclosure limit the present invention. From this disclosure, various alternative embodiments, examples, and operation techniques will be easily found by those skilled in the art.

For example, the first embodiment and the second embodiment can be achieved independently or in combination.

The following method can be used in addition to the interference source base station identification method of the second embodiment. Specifically, the radio terminal 2A transmits cell IDs (base station identification information) of the neighboring radio base stations 1B to 1G that can be monitored, instead of the location information. Thus, the interference source identifying unit 125 can easily identify the interference source base station. Moreover, of the neighboring radio base stations 1B to 1G, a radio base station from which the radio terminal 2A is likely to receive interference can be previously identified by adding signal reception intensity from each of the neighboring radio base stations 1B to 1G along with the cell ID.

In the first embodiment and the second embodiment described above, the neighboring radio base stations 1B to 1G are exemplarily described as the interference source. However, not only such macro base stations but also a small base station (so-called femtocell) that forms a communication area in the communication area 5A of the radio base station 1A may be the target.

In the first embodiment and the second embodiment described above, the radio communication system 10 based on the LTE standard is described. However, the present invention is not limited to the LTE standard and can be also applied to a radio communication system based on WiMAX standard (IEEE 802.16) and the like.

In the first embodiment and the second embodiment described above, an example is described where a unit of a frequency for measuring the radio communication quality (subband) and a unit of allocating a frequency to a radio terminal (communication channel) are different. Instead, the unit of measurement and the unit of allocation may be the same.

As described above, it should not be understood that the present invention includes various embodiments which are not described herein. Accordingly, the technical scope of the present invention should be determined only by the matters to define the invention in the scope of claims regarded as appropriate based on the disclosure.

Note that the entire contents of Japanese Patent Application No. 2009-43164 (filed on Feb. 25, 2009) are incorporated herein by reference.

INDUSTRIAL APPLICABILITY

As described above, the radio base station and the radio communication method according to the present invention can detect an interfered frequency with a high interference level from an interference source easily and with high accuracy. Thus, the present invention is useful in radio communications such as mobile communications.

The invention claimed is:

1. A radio base station which performs radio communications with a radio terminal configured to measure a radio communication quality in each of a plurality of predetermined communication frequencies, the radio base station comprising:
    a receiver configured to receive a radio quality value indicating the radio communication quality of each of the communication frequencies for a plurality of times from the radio terminal, or configured to receive the radio quality value from a plurality of radio terminals including the radio terminal;
    a counting unit configured to count the number of times the receiver receives the radio quality value that degrades below a predetermined threshold value for each of the plurality of communication frequencies; and
    a detector configured to detect a communication frequency for which the number of times counted by the counting unit reaches the predetermined number of times from among the plurality of communication frequencies, as an interfered communication frequency that receives at least a predetermined level of interference from an interference source.

2. The radio base station according to claim 1, further comprising an acquiring unit configured to acquire terminal location information indicating at least one of a location of the radio terminal and a distance between the radio terminal and the radio base station, wherein
    the counting unit counts, on the basis of the terminal location information acquired by the acquiring unit, the number of times the receiver receives the radio quality value which is transmitted from the radio terminal located in a predetermined area and which degrades below the predetermined threshold value.

3. The radio base station according to claim 2, wherein the predetermined area is an edge portion of a communication area of the radio base station.

4. The radio base station according to claim 1, further comprising:
    an interference source identifying unit configured to identify an interference source base station when the interfered communication frequency is detected by the detector, the interference source base station being another radio base station serving as the interference source; and
    an acquiring unit configured to acquire base station location information on locations of other radio base stations located within a predetermined range from the radio base station, wherein
    the interference source identifying unit identifies the interference source base station on the basis of the terminal location information and the base station location information.

5. The radio base station according to claim 1, wherein the receiver receives the radio quality value indicating a predetermined number of lowest radio communication qualities from among the radio communication qualities respectively measured for the plurality of communication frequencies by the radio terminal.

6. A radio communication method for performing radio communications with a radio terminal configured to measure a radio communication quality in each of a plurality of predetermined communication frequencies, the method comprising the steps of:
    receiving a radio quality value indicating the radio communication quality of each of the communication frequencies for a plurality of times from the radio terminal, or receiving the radio quality value from a plurality of radio terminals including the radio terminal;
    counting the number of times the receiver receives the radio quality value that degrades below a predetermined threshold value for each of the plurality of communication frequencies; and
    detecting a communication frequency for which the number of times counted by the counting unit reaches the predetermined number of times from among the plurality of communication frequencies, as an interfered communication frequency that receives at least a predetermined level of interference from an interference source.

* * * * *